UNITED STATES PATENT OFFICE.

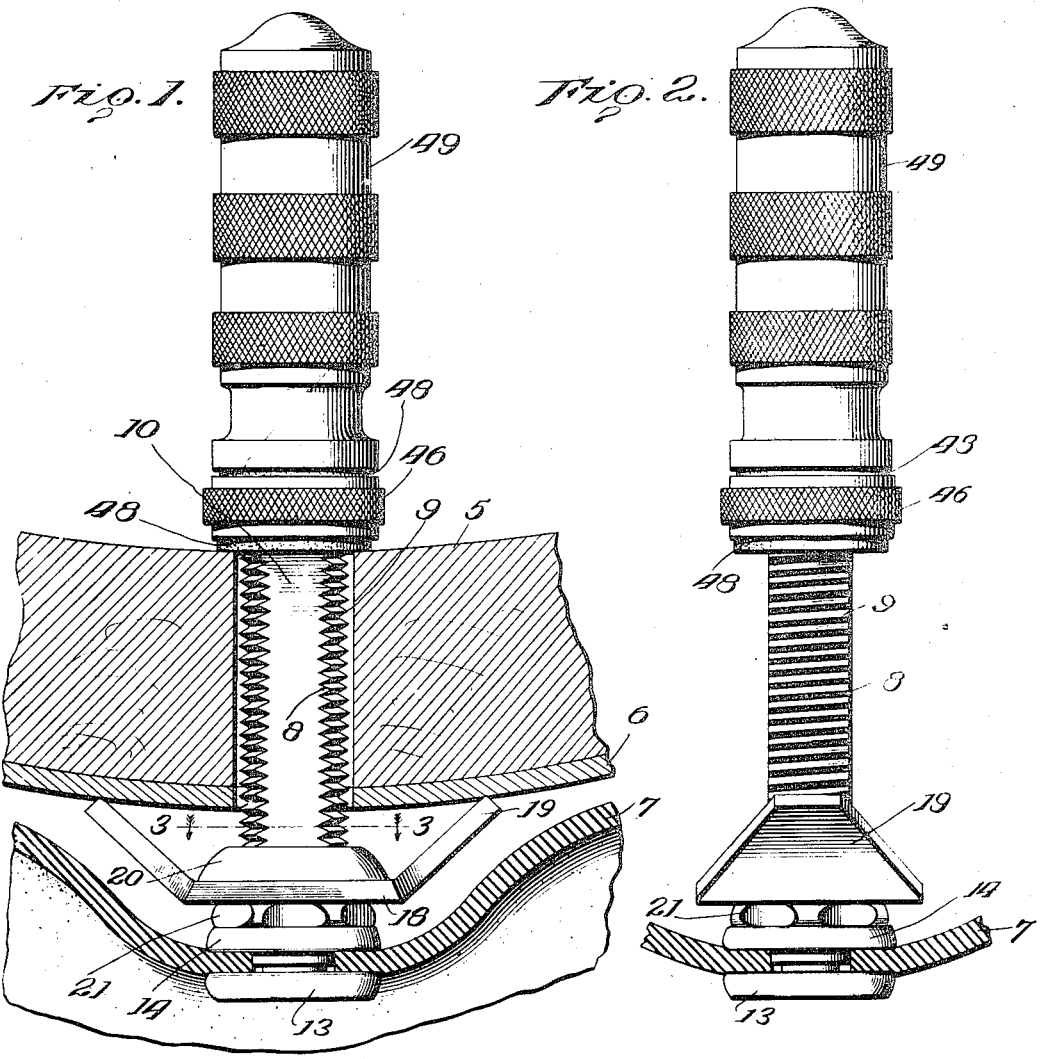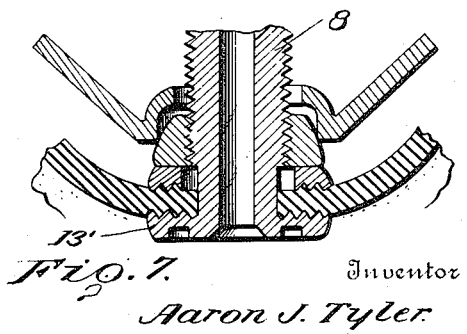

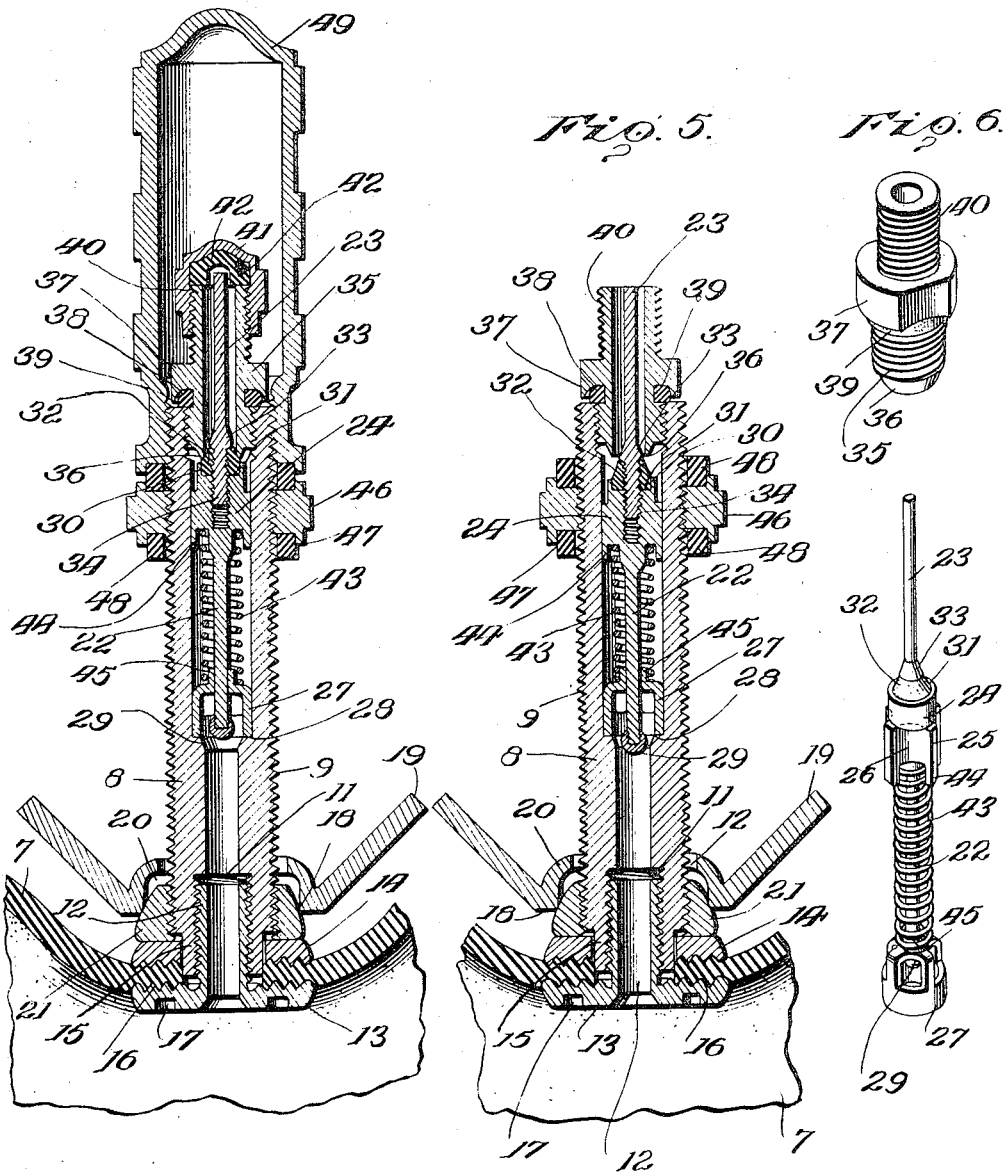

AARON J. TYLER, OF ROCHESTER, NEW YORK, ASSIGNOR OF TWO-THIRDS TO HOWARD L. BIDELMAN, OF ROCHESTER, NEW YORK.

PNEUMATIC VALVE.

1,140,634.　　　　　Specification of Letters Patent.　　Patented May 25, 1915.

Application filed July 23, 1912. Serial No. 711,125.

*To all whom it may concern:*

Be it known that I, AARON J. TYLER, citizen of the United States, residing at Rochester, in the county of Monroe and State of New York, have invented certain new and useful Improvements in Pneumatic Valves, of which the following is a specification.

This invention relates to pneumatic valves and more particularly to that class of valves especially designed for application to the tires of automobiles, bicycles and the like.

The primary object of the invention is to provide a pneumatic tire valve, the construction of which is such that when the valve is moved to open position, a full charge or volume of air may be forced into the inner tube of the tire with very little friction and when the valve is closed, the latter will be firmly sealed against back pressure.

A further object of the invention is to provide a valve, the felly engaging nut of which may be detached from the threaded stem or casing without the necessity of first removing the valve cap and plug.

A further object is to provide novel means for clamping the threaded stem or casing in engagement with the inner tube of the tire, and means for anchoring the fixed end of said casing to the rim of the wheel.

A still further object of the invention is generally to improve this class of devices so as to increase their utility, durability and efficiency, as well as to reduce the cost of manufacture.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a side elevation of a pneumatic tire valve constructed in accordance with the present invention, showing said valve in position on the felly of a wheel, the felly and inner tube of the tire being shown in section for the sake of clearness; Fig. 2 is a front elevation, the felly and rim being omitted; Fig. 3 is a transverse sectional view taken on the line 3—3 of Fig. 1 and looking in the direction of the arrows; Fig. 4 is a vertical sectional view of Fig. 1, showing the valve in closed position; Fig. 5 is a similar view with the dust cap removed and showing the valve in open position; Fig. 6 is a perspective view of the valve removed from the casing, the plug being also shown detached immediately above said valve; Fig. 7 is a detail vertical section view, showing a slightly modified form of clamping member.

Corresponding and like parts are referred to in the following description and indicated in all the views of the accompanying drawings by the same reference characters.

The improved inflation valve forming the subject matter of the present invention is principally designed for application to the tires of automobiles, bicycles and the like and by way of illustration is shown applied to an automobile wheel of the ordinary construction in which 5 designates the felly, 6 the rim and 7 the inner tube.

The device comprises a hollow stem or casing 8 having two of its sides provided with threads 9 and its other sides flattened at 10, said threads and flattened portions extending throughout the entire length of the casing. The lower end of the stem or casing 8 is provided with a longitudinal bore 11, the walls of which are threaded for engagement with the correspondingly threaded walls of a tubular member 12 carried by a clamping disk 13.

Coacting with the clamping disk 13, is a mating disk 14, the latter being loosely mounted on a reduced cylindrical portion 15 on the lower end of the casing. The inner faces of the disks 13 and 14 are provided with annular ribs 16 adapted to bite into the inner tube and thus assist in firmly gripping the same. The lower disk 13 is preferably provided with spaced depressions 17 adapted to receive a wrench or spanner for the purpose of adjusting said disk when fitting the valve to the inner tube, it being understood that the disk is fitted to the tube before the ends of the tube are cemented together.

Arranged above the upper clamping disk 14, is a bracket 18 having diverging wings or terminals 19 adapted to bear against the rim 6 of the wheel and assist in anchoring the casing 8 in position on the felly. The central portion of the bracket 18 is pressed laterally to form a substantially circular socket 20 adapted to receive the correspondingly curved surface of a clamping nut 21 by which the clamping disk 14 is driven toward the disk 13. The socket 20 not only serves to accommodate the nut 21 but also allows the parts to be compactly assembled.

Arranged within the casing 8, is a valve, the stem of which is preferably formed in two sections 22 and 23. Secured to or formed integral with the lower section 22, is a guiding member 24 having spaced ribs 25 formed thereon and defining intermediate grooves or channels 26 to permit the passage of air to the inner tube of the tire. Slidably mounted on the lower end of the stem section 22, is a cage 27, the lower end of which normally rests on an annular shoulder 28 formed in the longitudinal bore of the casing 8. The cage 27 is retained in position on the lower stem section 22 by means of a stop 29, preferably in the form of a ball, having a threaded opening therein which engages the correspondingly threaded end of the stem section 22. The upper end of the guiding member 24 is provided with an annular flange 30 defining a pocket or seat 31 for the reception of a valve indicated at 32. The valve 32 is conical in shape and formed of rubber or other suitable material, there being a projection 33 formed on the valve stem section 23 against which the reduced end of the valve 32 abuts. The upper valve stem section 23 is threaded at 34 in a correspondingly threaded socket formed in the guiding member 24 so as to permit the upper valve stem section 23 to be readily detached from the guiding member 24 when it is desired to repair or replace the valve 32.

Threaded in the upper end of the casing 8, is a plug 35, the lower end of which is inclined or beveled to form a conical valve seat 36 adapted to engage the valve 32 so as to prevent the escape of air after the tire has been inflated. The plug 35 is provided with an annular enlargement 37 having oppositely disposed flattened faces so as to permit the plug to be readily grasped in the hand or with a suitable tool and adjusted to the casing 8. The lower face of the enlargement 37 is provided with a seating recess 38 for the reception of a washer or gasket 39, the walls of the recess 38 being preferably inclined laterally so as to assist in preventing spreading of the material constituting the washer when the plug 35 is screwed home on the valve casing. The upper end of the plug 35 is extended longitudinally to form an exteriorly threaded nipple 40 adapted to receive a correspondingly threaded cap or closure 41. Seated in the cap 41, is a gasket 42 having an opening therein for the reception of the adjacent end of the upper valve stem section 23.

Interposed between the guiding member 24 and cage 27, is a coil spring 43 which serves to normally and yieldably retain the valve 32 to its seat. It will here be noted that the ribs 25 on the guiding member extend longitudinally beyond the base thereof to form spaced lugs 44 which embrace the convolutions at the adjacent end of the spring and serve to center the spring on said guiding member. The other end of the coil spring encircles a centering boss 45 formed on the upper portion of the cage 27. Attention is here called to the fact that when the valve 32 is moved to open position, a free unobstructed passage will be afforded for the air through the casing 8 to the inner tube of the tire, thus preventing friction and insuring a full charge of air at each inflation of the tire. The ribs 25 not only serve to center and guide the member 24 when the upper section 23 of the valve stem is depressed, but also permit the passage of air between said ribs when the valve is moved to open position.

Mounted for rotation on the valve casing 8, is a clamping nut 46 having oppositely disposed grooved faces 47 in which are seated preferably leather washers 48. One of the washers 48 is adapted to bear against the felly 5 of the wheel, while the other forms a seat for a dust guard or cap, indicated at 49. The dust cap or guard, as well as the clamping nut 46, are preferably roughened so as to afford a good hand grip when adjusting the parts.

It will here be noted that the diameter of the plug 35 and cap 41 is less than the diameter of the clamping nut 46, so that the nut 46 may be readily unscrewed from the valve casing 8 without the necessity of first removing the cap 41 and plug 35, when it is desired to detach the valve casing from or attach said valve casing to an automobile wheel. It will also be noted that the valve seat 36 is formed directly on the lower end of the plug 35 so that the plug may be readily removed when it is desired to regrind the valve seat by merely grasping the flattened portion of the enlargement and rotating the plug with the fingers. It will be further noted that when the nut 46 is turned home against the inner circumference of the felly, the nut 21 will be drawn toward the felly and the wings 19 of the bracket 18 forced against the rim.

In Fig. 7 of the drawings, there is illustrated a modified form of the invention in which the lower disk 13' is formed integral with the lower end of the stem or casing 8, the construction and operation of the device being otherwise similar to that shown in Fig. 1 of the drawings. An extra clamping member may be employed for retaining the valve in position on the inner tube of the tire, if desired.

From the foregoing description, it will be seen that when the cap 41 is removed and the usual air hose or tube threaded on the nipple 40, the valve 32 will be unseated, thus allowing a full volume of air to flow through the passages 26 in the guiding member and through the openings in the cage into the interior of the inner tube. The parts are so arranged that an unobstructed passage is afforded and friction therefore reduced to a minimum, thereby materially increasing the efficiency of the valve and permitting the tire to be inflated in less time than heretofore and with much less energy on the part of the operator.

Having thus described the invention, what is claimed as new is:

1. A pneumatic valve including a casing, a plug engaging the casing and provided with a valve seat, a guiding member disposed within the casing and provided with spaced ribs defining intermediate air passages, a sectional valve stem extending from the guiding member, a cage loosely mounted on one section of the valve stem, a valve carried by the other section of the stem, and a spring interposed between the guiding member and cage for normally and yieldably holding the valve to its seat.

2. A pneumatic valve including a casing, a plug engaging the casing and provided with a valve seat, a guiding member disposed within the casing and provided with spaced ribs defining intermediate air passages, a sectional stem extending from the guiding member, one section of said stem being threaded in an opening in the guiding member, a cage loosely mounted on one of the stem sections, a valve carried by the threaded stem section, and a spring interposed between the guiding member and cage for normally and yieldably holding the valve to its seat.

3. A pneumatic valve including a casing, a plug threaded in one end of the casing and provided with a valve seat, a guiding member disposed within the casing and having an upstanding flange defining a depression, said guiding member being provided with spaced ribs forming intermediate air passages, a valve stem depending from the guiding member, a second valve stem threaded in the guiding member and provided with a projection, a valve seated in the depression of the guiding member and bearing against said projection, a cage slidably mounted on the first mentioned stem section, and a spring interposed between the cage and guiding member.

4. A pneumatic valve including a casing, a plug seated in the casing and provided with a valve seat, a guiding member disposed within the casing and provided with longitudinal ribs defining intermediate air passages, the ribs being extended below the bottom of the guiding member to form centering lugs, a valve stem formed integral with the guiding member and having its lower end provided with a stop, a cage engaging said stop, the upper end of the guiding member being provided with a seating recess, a valve seated in said recess, and a coil spring interposed between the cage and guiding member and centered on the stem by engagement with the lugs.

In testimony whereof I affix my signature in presence of two witnesses.

AARON J. TYLER. [L. S.]

Witnesses:
 SAMUEL N. ACKER,
 W. N. WOODSON.